Feb. 6, 1968     E. A. MEYER     3,367,082
ADAPTOR AND MOLDING ASSEMBLY
Filed Feb. 3, 1966
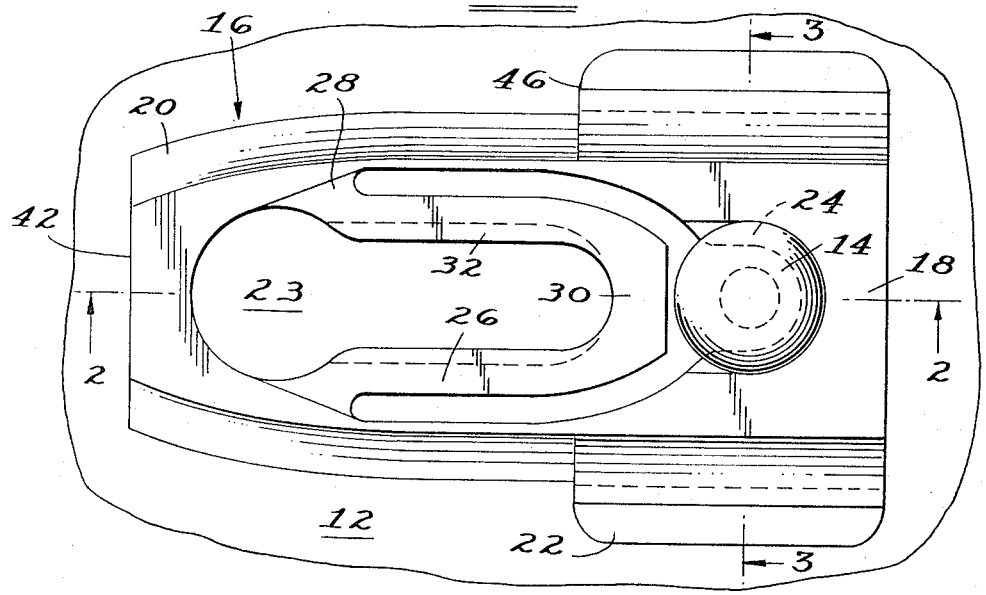
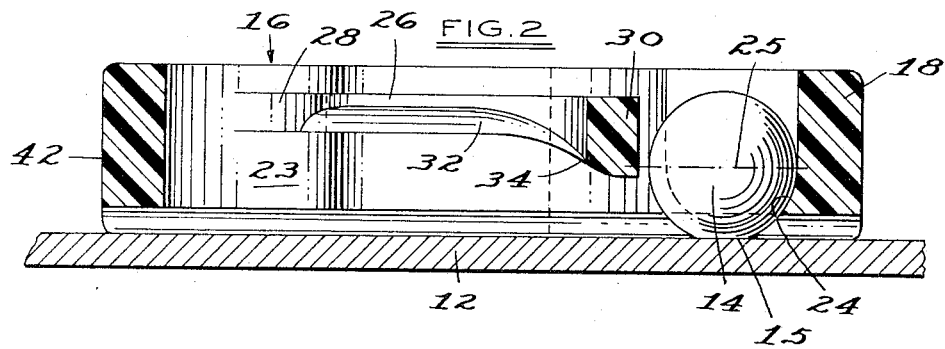
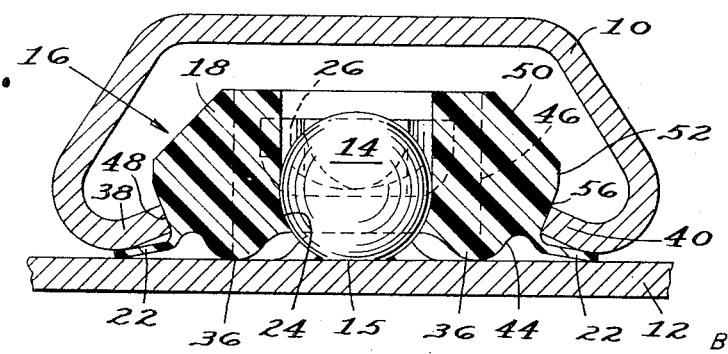
INVENTOR
ENGELBERT A. MEYER
BY
*Burton & Parker*
ATTORNEYS 3,367,082
ADAPTOR AND MOLDING ASSEMBLY
Engelbert A. Meyer, Union Lake, Mich., assignor to
Chicago United Products Company, Inc., Detroit,
Mich., a corporation of Michigan
Filed Feb. 3, 1966, Ser. No. 524,731
5 Claims. (Cl. 52—718)

ABSTRACT OF THE DISCLOSURE

This disclosure relates to an adaptor and assembly, wherein the adaptor has an opening for receiving a button secured to a support, an opposed button seat, and U-shaped tongue portion resiliently joined to the body portion of the adaptor restricting withdrawal of the button from the button seat.

---

Molding devices are used in the manufacture of automobiles, refrigerators and the like to meet functional and design requirements.

The button, which is a spherical ball in this embodiment of my invention, is preferably attached to the support in accordance with the method described in my United States Letters Patent No. 2,153,468, wherein the button is welded to steel or adhesively secured to various materials including steel, thereby eliminating the corrosion problem inherent in previously used techniques requiring a hole through the support. A series of spaced buttons for a single longitudinal molding device may be applied in a gang operation with accurate alignment.

The spherical button of this invention is small when compared to previously employed fasteners in the automotive trim field. A suitable size spherical button for use in automotive manufacture, involves a metal ball 0.156 inch in diameter, with a 0.012 to 0.015 inch "burn off" of the ball at the interface between the ball and the support surface. Utilization of this new concept of trim attachment in the automotive field provides substantial economies and advantages in the manufacturing and warehousing of doors, fenders and the like. Similar advantages are attainable in other fields, such as home appliances, refrigerators, stoves and the like. Business and electronic equipment offer other areas of commercial development.

The instant invention will be discussed in the context of an automotive molding device assembly.

An adaptor is provided which may be applied in assembly line operation to a previously attached spherical button on the automotive component such as a door, this component and button having been processed through finishing and painting operations.

On the assembly line, the adaptor is connected to the spherical button by inserting the button in a keyhole slot provided in the adaptor, and the adaptor is then shifted to produce a frictional seating of the adaptor on the automotive component in an approximate final alignment for acceptance of a flanged molding device, the opposed inturned flanges of which are snapped over the adaptor to lock the molding device on the automotive support.

The adaptor need not be accurately aligned prior to the application of the molding device. A pilot is provided on the adaptor which is engaged by the inturned flanges of the molding device, thereby camming the adaptor into final alignment position. The pilot of the adaptor can be formed to correct a misalignment of about 45 degrees, the mere pressing application of the molding device causing the desired predetermined final alignment of the adapter for final locking of the molding device thereto. Laterally extending nonmetallic fins are provided on the adaptor to provide insulation against electrolytic corrosion of the metal parts, and to resiliently tension the adaptor seat against the spherical button. The fins are, in the completed assembly, sandwiched between the molding device and the surface of the automotive support.

Summary of the invention

The adaptor of my invention is suitable for attaching a hollow molding device, or the like, to a support having a button attached thereto. The adaptor has a button seat contoured to receive the enlarged head of the button, a U-shaped tongue portion resiliently joined to the body portion of the adaptor with the bite extending toward the button seat, and an opening in the adaptor for receiving a button therethrough. The button head is received in the adaptor opening, and the adaptor is shifted to urge the button beneath the U-shaped tongue portion. The tongue portion is provided with a tapered channel therebeneath which urges the bite portion out of restrictive alignment with the button seat, and permits receipt of the button head on the button seat. In the embodiment disclosed, the button seat is spherically contoured to receive a spherical button, and the bite portion of the tongue extends vertically in its relaxed position below the horizontal center line of the spherical seat.

The adaptor assembly of my invention includes a support, a generally spherical button attached to the support and extending therefrom, and an adaptor secured to the support by the button. The adaptor has an opening for receiving the button, and an opposed button seat extending about the base of the button and tensioned therebeneath. A tongue portion is resiliently joined to the adapter having a free end opposing the button seat, thereby restricting removal of the button from the seat. The tongue portion has a surface opposed to the support tapering from the free end away from the support. The end surface of the tongue portion facing the button seat extends over a major portion of the diameter of the button perpendicular to the support.

The spherical button of this embodiment of my invention has several advantages in securing the button to the support over buttons comprising a shank which is welded to the support, and a head which is spaced from the support. One advantage is that the spherical button does not require a special feed mechanism which aligns the button for securement to the support. A spherical button does not require configured conduits, for example, between the source and the attachment device. Another advantage of the spherical button is that the button need not be aligned with the support in order to seat the adaptor, as a spherical button is aligned in any position.

Other objects, advantages and meritorious features will more fully appear from the following specification, claims and accompanying drawings, wherein:

FIG. 1 is a top elevation of one embodiment of the molding assembly of this invention;

FIG. 2 is a cross-sectionl view of the embodiment shown in FIG. 1 in the direction of view arrows 2—2; and FIG. 3 is a cross-sectional view of the embodiment shown in FIG. 1 in the direction of view arrows 3—3.

Referring now to FIGS. 1 to 3, it will be seen that the molding assembly comprises a hollow molding device 10, a support 12 with a spherical button 14 attached thereto and extending therefrom, and an adaptor 16 interconnecting the molding device to the support.

The adaptor 16 includes a body 18 and a longitudinally aligned pilot 20 (FIG. 1) with lateral fins 22 extending downwardly at an angle from the bottom of the body. The body 18 has an opening 23 which receives the spherical button 14 therethrough, and a spherically concave button-receiving seat 24 which is tensioned against the underside of the spherical button, as explained hereinafter. A U-shaped tongue is resiliently joined to the body portion 18 at its arms 28, adjacent the opening 23. The bight portion 30 of the U-shaped tongue extends to restrict removal of the adaptor in the direction of the opening in the button seat 24, and extends, in its relaxed position, below the horizontal center line 25 (FIG. 2) of the button 14 and the spherical button seat 24.

The adaptor is secured to the spherical button 14 by disposing the button through the opening 23 of the adaptor, and shifting the adaptor longitudinally toward seating engagement. The button will bear against the underside of the tongue 26 which is provided with a channel 32, to guide the adaptor movement. The channel is tapered near the bight 30 of the tongue at 34 (FIG. 2), so that the tongue is biased upwardly out of restrictive interference with the seat 24, as the adaptor is shifted longitudinally. As the adaptor is shifted, it is compressed toward the panel 12 to overcome the resilient bias of the fins 22 and the longitudinal bases 36, to seat the spherical button 14 on the seat portion 24 of the body. When in final position, a frictional face-to-face engagement of the longitudinal bases 36 with the support 12 is produced which maintains the adaptor in a fixed position on the support. The fins 22 are also placed in a bias condition by this movement and aid in the maintenance of the adaptor in approximate aligned condition, the fins 22 being swung to a flattened condition substantially coplanar with the bases 36.

The adaptor need not be accurately positioned in a final aligned condition. However, in some situations, final alignment may be desirable in which case the adaptor may be so aligned and reliance placed on the frictional mounting to maintain the alignment of a single or a plurality of adapters.

The pilot 20 extends longitudinally forward from the body 18 of the adaptor and provides dome-like camming surfaces extending downwardly from its narrow top which the inturned flanges 38 and 40 (FIG. 3) of the molding device 10 engage upon inward attaching movement, thereby causing an orienting, turning or rotating of the adaptor around the spherical button into the required alignment. It will be noted that the dome-like camming surfaces of the pilot 20 on the outer side walls of the pilot converge to a nose 42 at the forward end of the pilot, this convergence enabling the flanges 38 and 40 to swing the adaptor to the required aligned position.

This relationship is more fully described in my copending application Ser. No. 337,859, filed Jan. 15, 1964, now U.S. Patent No. 3,239,988.

Critical manufacturing and assembly tolerances are met by the adaptor body design. The underside of the adaptor has two spaced longitudinal bases 36, 36, one on each side of the button seat, which engage the automobile support 12. The adaptor is relieved by channels 44 (FIG. 3) at the juncture of the fins 22 with the body 18 to eliminate any effect of their biased condition on the maintenance of the bases 36, 36 in face to face dimension controlling contact with the automobile support 12. Top to bottom transverse cutout portions 46 between the body 18 and the pilot 20 are also provided for this purpose.

The molding device 10 is a longitudinally extending hollow channel having opposed inturned longitudinal inner flanges 38 and 40. On installation, one of the flanges 38 may be moved into the longitudinal groove 48 on one side of the body 18, and the other inturned flange 40 is then pressed against the tapered side 50 of the body to expand the molding device. After which flange 40 moves past the vertical side wall 52 and springs into groove 56 on the opposite side of the body 18. In the assembled position, the tapered walls 48 and 56 extend to overlie the inturned flanges of the molding device, to inhibit removal. It will be noted that the nonmetallic fins 22 extend laterally of the body 18 adjacent the inner or bottom portion of the grooves 48 and 56 and upon application of the molding device serve as insulation against elecrtolytic corrosion between the device and the support, the fins 22 being sandwiched therebetween as shown in FIG. 3. This arrangement spaces the molding device from the automobile support, thereby allowing air circulation under the molding device in the portions between the adaptors to evaporate moisture and inhibit corrosion problems.

While various materials may be used for all parts of the assembly, the automotive industry utilizes metal primarily for the automotive support and for the molding device. Steel is primarily used for the automotive support with stainless steel being used for the button as well as with cold-rolled zinc plated steel. The buttons are stud welded to a prefabricated automotive support, before painting, or at least before final finishing, in a predetermined orientation. After cleaning, coating and polishing, the automotive support is ready to receive the adaptor. Preferably the adaptor is made of a nonmetallic resilient material to provide an electrolytic corrosion barrier between the nonsimilar metal parts. A suitable material for the adaptor is a thermoplastic resin, such as fiber filled nylon, polycarbonates, acetal resins, and polypropylene.

The spherical button 14 may be welded to the support 12 substantially as described in my United States Letters Patent No. 2,153,468. Where a metallic button and support is employed, the button may be heat welded to the support, wherein a portion of the spherical button is burned off, as shown at 15 in FIGS. 2 and 3. The burn off 15 provides a flat surface on the spherical button, which increases the surface contact area between the button and the support, thereby strengthening the bond. A suitable size spherical button for use in automotive design, is a button 0.156 inch in diameter, which may be characterized as a ball member of BB shot size.

What is claimed is:

1. An adaptor for attaching a hollow molding device to a support having an outer surface with a button attached thereto, said button having an enlarged head portion spaced from the plane of the support, comprising, a body portion having an open ended seat contoured to receive the enlarged head of the button, a U-shaped tongue portion resiliently joined at its arms to said body portion with the bight of said U-shaped tongue portion extending to restrict removal of a button received in said seat in the direction of its open end, an opening defined in said body portion for receiving said button, and a tapered channel defined on the underside of said tongue portion communicating with said opening and extending toward the open end of said seat for receiving a button from said opening and biasing said tongue portion upward out of restrictive interferences with said seat as the button is shifted toward said seat.

2. The adaptor defined in claim 1, wherein said seat is spherically contoured to receive a spherical button.

3. The adaptor defined in claim 2, wherein said bight portion of said tongue extends vertically in its relaxed position below the horizontal center line of said spherical seat.

4. The adaptor defined in claim 1, wherein said opening in the body is an aperture, and said tapered channel defined in said tongue portion is a slot communicating with said opening to define a keyhole slot having a minor diameter less than the enlarged head of a button which is received beneath said tongue portion.

5. An adaptor assembly, comprising: a support, a generally spherical button attached to said support and extending therefrom, and an adaptor secured to said support by said button, said adaptor having an opening for receiving said button and an opposed button seat extending about the base of said button and tensioned therebeneath, a tongue portion resiliently joined to said adaptor having a free end opposing said button seat restricting removal of said button from the seat, said tongue portion having a surface opposed to said support tapering from said free end away from said support, said free end having a surface facing said button seat, said surface extending over a major portion of the diameter of said button perpendicular to said support, whereby a button received in said opening beneath said tongue portion biases the tongue portion out of restrictive interference with said seat as the button is shifted toward said seat.

References Cited

UNITED STATES PATENTS

| | | | |
|---|---|---|---|
| 2,172,302 | 9/1939 | Tinnerman | 24—737 |
| 2,275,900 | 3/1942 | Hall | 52—511 |
| 3,153,468 | 10/1964 | Sweeney | 52—718 |
| 3,216,166 | 11/1965 | Brown | 52—511 |
| 3,239,988 | 3/1966 | Meyer | 52—718 |
| 3,246,440 | 4/1966 | Meyer | 52—718 |

FRANCIS K. ZUGEL, *Primary Examiner.*